United States Patent
Dreffke et al.

(10) Patent No.: US 10,650,799 B2
(45) Date of Patent: May 12, 2020

(54) ACTIVE VIBRATION ABSORPTION SYSTEM AND METHOD FOR ABSORBING VIBRATION OF A VIBRATING ELEMENT IN A MOTOR VEHICLE

(71) Applicant: AUDI AG, Ingolstadt (DE)

(72) Inventors: Gerald Dreffke, Pfaffenhofen (DE); Lars Hinrichsen, Ingolstadt (DE); Florian Bock, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/324,523

(22) PCT Filed: Oct. 4, 2017

(86) PCT No.: PCT/EP2017/075116
§ 371 (c)(1),
(2) Date: Feb. 8, 2019

(87) PCT Pub. No.: WO2018/099631
PCT Pub. Date: Jun. 7, 2018

(65) Prior Publication Data
US 2020/0027438 A1    Jan. 23, 2020

(30) Foreign Application Priority Data
Nov. 30, 2016    (DE) .................. 10 2016 223 864

(51) Int. Cl.
*G10K 11/178*    (2006.01)
*F16F 7/10*    (2006.01)
(Continued)

(52) U.S. Cl.
CPC ........ *G10K 11/17873* (2018.01); *B60R 13/08* (2013.01); *F16F 7/1011* (2013.01);
(Continued)

(58) Field of Classification Search
CPC ........... G10K 11/178; G10K 11/17873; G10K 2210/106; G10K 2210/1281;
(Continued)

(56) References Cited

U.S. PATENT DOCUMENTS

| | | | | |
|---|---|---|---|---|
| 4,929,874 A | * | 5/1990 | Mizuno ................... | F16F 15/02 310/51 |
| 5,083,038 A | * | 1/1992 | Fukushima ........... | H02J 7/1446 290/40 A |

(Continued)

FOREIGN PATENT DOCUMENTS

| | | |
|---|---|---|
| CN | 101438077 A | 5/2009 |
| DE | 4424225 A1 | 1/1996 |

(Continued)

OTHER PUBLICATIONS

International Preliminary Report on Patentability directed to related International Patent Application No. PCT/EP2017/075116, completed Nov. 16, 2018, with attached English-language translation; 14 pages.

(Continued)

*Primary Examiner* — Thang V Tran
(74) *Attorney, Agent, or Firm* — Sterne, Kessler, Goldstein & Fox P.L.L.C.

(57) ABSTRACT

The disclosure relates to an active vibration absorption system for absorbing the vibrations of a vibrating element. The vibration absorption system comprises a structure-borne sound exciter having a coupling element for coupling to the vibrating element and having an electrical coil for moving the coupling element by means of a coil current. The structure-borne sound exciter is designed to provide a measurement signal correlated with a detected induced voltage. Furthermore, the vibration absorption system comprises a control device, which is designed to identify a target current intensity of the coil current in accordance with the measure- (Continued)

ment signal and to control an actual current intensity of the coil current to the target current intensity. The target current intensity is designed to adjust the motion of the coupling element in such a way that the vibrations of the element are at least partly absorbed. Moreover, the control device is designed to identify a detection component and a control component from the measurement signal and to identify the target current intensity in accordance with the detection component.

13 Claims, 1 Drawing Sheet

(51) Int. Cl.
*B60R 13/08* (2006.01)
*F16F 15/00* (2006.01)

(52) U.S. Cl.
CPC .......... *F16F 15/002* (2013.01); *F16F 15/005* (2013.01); *F16F 2222/06* (2013.01); *F16F 2228/066* (2013.01); *F16F 2230/18* (2013.01); *G10K 2210/1282* (2013.01); *G10K 2210/1291* (2013.01)

(58) Field of Classification Search
CPC .... G10K 2210/1282; G10K 2210/1291; B60R 13/00; B60R 13/08; F16F 7/10; F16F 7/1011; F16F 15/02; F16F 15/002; F16F 15/005; F16F 2222/06; F16F 2228/066; F16F 2230/18
See application file for complete search history.

(56) References Cited

U.S. PATENT DOCUMENTS

| | | | |
|---|---|---|---|
| 5,439,204 A * | 8/1995 | Yamazoe | F16F 13/264 267/140.14 |
| 5,623,766 A | 4/1997 | Ruck et al. | |
| 5,651,072 A | 7/1997 | Nakao et al. | |
| 5,953,428 A | 9/1999 | Silverberg et al. | |
| 6,009,985 A * | 1/2000 | Ivers | F16F 7/1005 188/380 |
| 6,216,059 B1 | 4/2001 | Ierymenko | |
| 7,370,829 B2 * | 5/2008 | Badre-Alam | B64C 27/001 180/312 |
| 8,401,735 B2 * | 3/2013 | Muragishi | F16F 7/1005 188/378 |
| 2006/0287788 A1 * | 12/2006 | Ichikawa | F16F 13/264 701/36 |
| 2007/0256428 A1 | 11/2007 | Unger et al. | |
| 2010/0246086 A1 * | 9/2010 | Ishiguro | F16F 13/26 361/160 |
| 2012/0217108 A1 | 8/2012 | Muragishi et al. | |

FOREIGN PATENT DOCUMENTS

| | | |
|---|---|---|
| DE | 69831603 T2 | 3/2006 |
| EP | 0805432 A2 | 11/1997 |
| EP | 1218716 A1 | 7/2002 |
| JP | 10111692 A * | 4/1998 |
| JP | 3551653 B2 | 8/2004 |
| JP | 2011/137527 A | 7/2011 |
| JP | 2013/231452 A | 11/2013 |
| WO | WO-99/38153 | 7/1999 |

OTHER PUBLICATIONS

International Search Report and Written Opinion of the International Searching Authority directed to related International Patent Application No. PCT/EP2017/075116, dated Dec. 14, 2017, with attached English-language translation; 28 pages.

Chinese Application No. 201780050704.1, Office Action dated Dec. 23, 2019; English Translation from EPO Global Dossier, 10 pages.

* cited by examiner

ACTIVE VIBRATION ABSORPTION SYSTEM AND METHOD FOR ABSORBING VIBRATION OF A VIBRATING ELEMENT IN A MOTOR VEHICLE

TECHNICAL FIELD

The present application relates to an active vibration absorption system for absorbing the vibrations of a vibrating element. Additionally, the present application relates to a motor vehicle having a vibration absorption system of this type as well as a method for operating a vibration absorption system of this type.

BACKGROUND

Under particular circumstances, an element can be set into vibration. For example, a mechanical bearing in a motor vehicle can vibrate during a journey and may thereby produce undesirable acoustic phenomena as a result of this vibration. Coupling the vibrating element with an active vibration damper to absorb the vibrations of the vibrating element is known. For instance, EP 1 218 716 B 1 describes coupling a physical object to a transducer in order to control the motion of the physical object. The transducer provides a measurement signal that describes the motion of the physical object. The transducer is coupled to a control unit, which samples the measurement signal and provides a correction signal in order to bring about a change in the motion of the physical object. In each case, the system stipulates a different time frame for measuring the motion of the physical object and for performing a corrective function contained within the correction signal.

A disadvantage here is that performing the corrective function as a reaction to the measured motion of the physical object is associated with a delay, since the system alternately performs a measurement of the motion and a corrective action of said motion. The control of the motion of the physical object can thus become less precise.

A multidimensional feedback system that is used to reduce a noise component of a vibration is known from EP 0 805 432 A2. Two or more actuators are provided for this purpose.

An active vibration damper arrangement for attachment to a vibrating structure is described in DE 698 31 603 T2, wherein a vibration damper has a reference sensor, which measures vibrations of the vibrating structure. To damp the vibrations, the vibration damper is controlled in such a way that it generates a counter-vibration.

However, a disadvantage of this type of vibration dampers is that they have a complex design that is associated with high material and maintenance costs.

The problem addressed by the present invention is therefore that of providing a system for absorbing a vibration of a vibrating element that brings about a precise damping of the vibrations with a simple design.

BRIEF DESCRIPTION OF THE DRAWINGS/FIGURES

DETAILED DESCRIPTION

Figure 1:
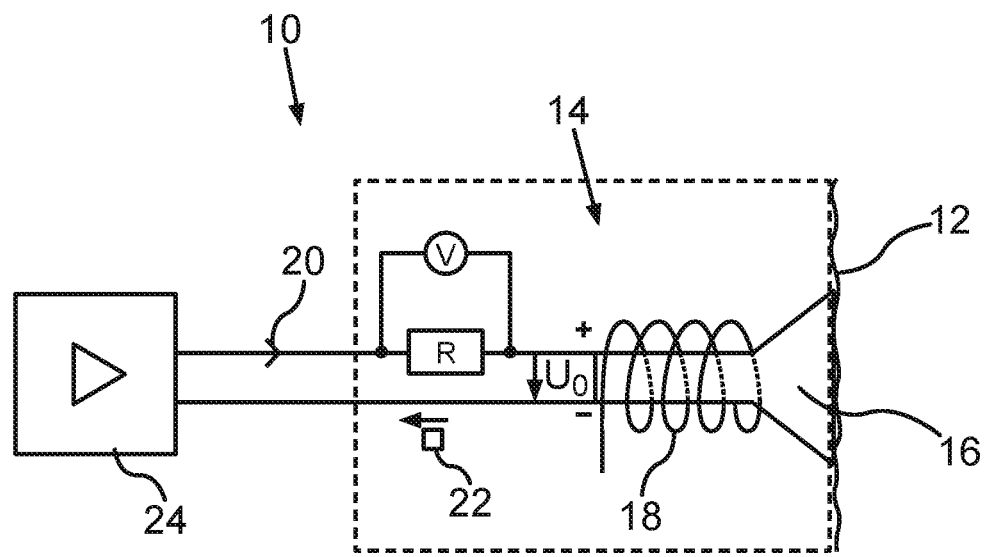
FIG. 1 is a schematic representation of an active vibration absorption system with a structure-borne sound exciter and a control device, in accordance with some embodiments.

This problem is solved by the disclosure made here in the independent and dependent claims, using the following description and figures.

In accordance with some embodiments, an active vibration absorption system, which comprises only one single structure-borne sound exciter for both detecting and absorbing a vibration of a vibrating element is disclosed. The vibrating element has an especially light-weight design as a result. Thus, in contrast to known vibration dampers, a smaller installation space is required for the active vibration absorption system. Its weight and costs are likewise reduced by the use of a single structure-borne sound exciter.

In accordance with some embodiments, for a combined use of the structure-borne sound exciter for detection and absorption, the vibration absorption system should be configured in such a way that it can determine from a measurement signal what portion of the measurement signal can be ascribed to a vibration of the vibrating element, wherein this portion will hereafter be designated the detection component. Furthermore, the vibration absorption system should be configured to detect from the same measurement signal the portion produced by an upcoming absorption of the vibration, which is hereafter designated the control component. It is thereby possible to perform a measurement of the vibrations of the vibrating element and a damping and/or absorption of said vibrations at the same time by means of the active vibration absorption system.

In accordance with some embodiments, the active vibration absorption system to absorb a vibration of a vibrating element is disclosed as follows: The active vibration absorption system comprises a structure-borne sound exciter having a coupling element for coupling to the vibrating element and having an electrical coil for moving the coupling element by means of a coil current. The coupling element can thus be connected, e.g., screwed, to the element, and a motion of the element can then be influenced by the coil current.

In accordance with some embodiments, the structure-borne sound exciter is configured to detect the induced voltage in the electrical coil and to provide a measurement signal that is correlated with the detected induced voltage. For example, the electrical coil is situated within a magnetic field of, for instance, a permanent magnet. A magnetic alternating field is created by the coil current in a known manner within the electrical coil and can bring about a motion of the electrical coil and/or of the coupling element. Conversely, a voltage can be induced in the electrical coil, likewise in a known manner, by a motion of the coupling element and thus a motion of the electrical coil. A vibration of the vibrating element can therefore be detected by an induced voltage in the electrical coil. The structure-borne sound exciter is thus sensorless, since it does not require an additional sensor to detect the vibrations of the vibrating element.

However, the measurement signal comprises not only the voltage induced by the vibrating element, expressed by the detection component, but also a voltage produced by an applied coil current, expressed by the control component. These two components must be separated. The measurement signal can describe the voltage that was measured on the electrical coil, for example. A portion of this voltage can arise from the fact that an applied coil current is flowing in the electrical coil, and a further portion of this voltage can arise in that the vibrations of the vibrating element induces a voltage in the electrical coil. Since the structure-borne sound exciter has only one electrical coil, the measurement signal detects both portions of the voltage, namely the detection component and the control component, at the same time.

In accordance with some embodiments, the structure-borne sound exciter is controlled by a control device. The control device is configured to receive the measurement signal provided by the structure-borne sound exciter and to identify a target current intensity of the coil current as a function of the measurement signal. The target current intensity is designed to adjust the motion of the coupling element in such a way that the vibrations of the vibrating element are at least partly absorbed. The target current intensity thus describes the current intensity that the applied coil current in the electrical coil should have in order to set the coupling element in motion or in order to apply a force to it in such a way that the vibrations of the vibrating element are at least partly absorbed. Furthermore, the control device is configured to control an actual current intensity of the applied coil current to the target current intensity, wherein the actual current intensity describes the current intensity that the coil current should have at a current point in time.

In accordance with yet another embodiments, the control device is designed to identify a detection component and a control component from the measurement signal. The detection component describes, in the aforementioned manner, that portion of a signal value of a measurement signal that can be traced back to the voltage induced by the vibrating element. The control component corresponds to that portion of the signal value that can be traced back to the applied coil current.

To identify the target current intensity, which controls the motion of the coupling element such that the vibrations of the vibrating element are at least partly absorbed by a counter-vibration of the coupling element, for example, it is advantageous for the control device to be configured to differentiate between the detection component and the control component in order to identify the target current intensity solely as a function of the detection component. In this way, a motion of the coupling element can be adapted with precision to the vibrations of the vibrating element.

In accordance with some embodiments, the control device has a processor system that is configured to identify the target current intensity and control the actual current intensity. The processor device can have at least one microprocessor and/or at least one microcontroller. Moreover, the processor device can include program code that is designed to carry out the identification of the target current intensity and the control of the actual current intensity when executed by the processor device. The program code can be stored in a data memory of the processor device.

In accordance with some embodiments, the aforementioned structure-borne sound exciter is configured to detect the vibrations of the vibrating element and absorb these vibrations by means of a corresponding activation by the control device at the same time in the manner described herein. Accordingly, the active vibration absorption system can advantageously undertake a constant control of the actual current intensity, which is adapted to a present measurement of the vibrations of the vibrating element. The vibrations of the vibrating element can thereby be precisely damped and, ideally, can be absorbed. Thereby, any disruptive acoustic phenomena that otherwise arise as a result of the vibrations of the vibrating elements are reduced. Owing to the continuous control of the actual current intensity by the control device and thus the continuous control of the motion of the coupling element, which absorbs the vibrations of the vibrating element, no further adaptation and/or control of the coupling element is necessary in order to absorb the vibrations.

The present application also includes alternative embodiments of the active vibration absorption system, which result in additional advantages.

In accordance with some embodiments, the control device is configured to identify the detection component and the control component simultaneously for an identical sample value or signal value that is contained in the measurement signal. The sample value or the signal value describes the current voltage, for example, which is measured at the electrical coil, wherein the voltage is brought about by the applied coil current on the one hand and is induced by a vibration of the vibrating element and thus by a vibration of the coupling element on the other hand. It is thereby possible to identify from each signal value the proportion of the induced voltage brought about by the vibrations. The control device thus does not require any further information from a further signal value. As a result, the control device does not experience a delay when identifying the target current intensity and thus no delay in the control of the actual current intensity of the coil current that is applied to the electrical coil, and so the vibrations of the vibrating element are absorbed quickly and precisely.

In accordance with yet another embodiments, the control device is configured to identify the detection component and the control component by means of predetermined transfer functions. Accordingly, the respective sources of the voltage in the electrical coils for the two portions, namely the detection component and the control component, can have different transfer functions. The control device thus has information in advance about the form in which the detection component and the form in which the control component assume in the measurement signal provided by the structure-borne sound exciter when there is a particular source. The transfer functions then once more allow the source to be deduced based on the measurement signal. In this way, a direct evaluation of the measurement signal can be undertaken by the control device, and the target current intensity can be identified for the quickest possible absorption of the vibrations of the vibrating element. Advantageously, this also results in no further sensors and/or components being required to determine the target current intensity.

In accordance with some other embodiments, the control device is configured to identify the target current intensity in a known manner such that a speed of movement of the vibrating element is controlled to zero. If the speed of movement of the vibrating element is zero, then the vibrations of the vibrating element are being absorbed by the structure-borne sound exciter. As a result of this control, the coupling element can advantageously be controlled by means of the coil current, which has the target current intensity, to a direct damping and/or absorption of the vibrations of the vibrating element.

As was already stated, the measurement signal can contain the coil voltage. In accordance with some embodiments, the structure-borne sound exciter is configured to measure the voltage in the electrical coil at at least one predefineable point in time. This point in time, for example, can be permanently predefined or can be linked with a predetermined event. The structure-borne sound exciter can measure the voltage in the electrical coil at multiple points in time, such as after each predefineable interval. The control device is configured to control the actual current intensity of the coil current simultaneously to the at least one predefineable time, and the active vibration absorption system is therefore designed to detect the vibrations of the vibrating element at the same time and to at least absorb the vibrations. It is ensured in this way that the absorption of the vibrations is continuously controlled so that the absorption is adapted to a present intensity of the vibrations of the vibrating element.

In accordance with yet another embodiments, the control device is configured to receive a measurement signal from each of the at least two structure-borne sound exciters. Moreover, the control device is configured to control an actual current intensity for each of the at least two structure-borne sound exciters. Accordingly, the control device can use the respective identified detection component to identify the respective target current intensity from the respective measurement signal for each structure-borne sound exciter. The identification of the respective target current intensity can also be correlated with the identification of the further target current intensity of the other structure-borne sound exciter, for example. Advantageously, this results in the vibrations of the element, which should be absorbed, e.g., by two structure-borne sound exciters, being absorbed with greater precision, since a central control device controls both structure-borne sound exciters.

In accordance with some embodiments, the electrical coil is configured as a voice coil. The voice coil is wound in a known manner onto a voice coil former, which is connected to a membrane unit of a speaker. Due to the applied coil current in the voice coil, the voice coil and the membrane unit is set in motion by means of a magnetic field. In this case, the coupling element can be configured as a membrane unit. One advantage of the use of the voice coil is that it is especially light-weight and thus reacts quickly, i.e., with little inertia, to the resulting magnetic field and performs the corresponding motion. Lags between the control of the coil current to the target current intensity by the control device and the at least partial absorption of the vibrations of the vibrating element by the motion of the structure-borne sound exciter can be reduced in this way.

In accordance with some embodiments, the structure-borne sound exciter is configured as a sound actuator. The sound actuator can be designed in a known manner to generate a predetermined sound and/or a predetermined noise, such as an engine noise of a motor vehicle. Accordingly, the sound actuator is also designed to at least partly absorb the vibrations of the vibrating element. For this purpose, the sound actuator has the same features as the structure-borne sound exciter disclosed herein in accordance with some embodiments. An advantage of this is that an existing component in a motor vehicle, for example, namely the sound actuator, can assume a further function, namely that of absorbing undesirable vibrations. This provides the possibility of absorbing undesirable vibrations in a manner that saves components and space.

In accordance with some embodiments, a motor vehicle having an active vibration absorption system is disclosed. Accordingly, the structure-borne sound exciter in accordance with some embodiments and disclosed herein is arranged on a vibrating or vibration-prone element in the motor vehicle. In particular, the vibrating element is described by a sheet metal part, especially a portion of the roof and/or engine hood and/or a tailgate of the motor vehicle.

In accordance with some embodiments, a motor vehicle may comprises the features of the active vibration absorption system in accordance with some embodiments disclosed herein. For this reason, the corresponding embodiments of the motor vehicle will not be described again here.

In accordance with some embodiments, a method for operating an active vibration absorption system for absorbing the vibrations of a vibrating element is disclosed. In the first method step, a structure-borne sound exciter detects an induced voltage in an electrical coil of the structure-borne sound exciter, which is coupled to the vibrating element by means of a coupling element. The electrical coil moves the coupling element by means of a coil current and/or applies a force to it. This is carried out by means of a magnetic field, for example, within which the electrical coil is disposed.

In a second method step, the structure-borne sound exciter provides a measurement signal that is correlated with the detected induced voltage. In a third method step, a control device receives the measurement signal and, in the manner described, identifies a target current intensity of the coil current as a function of the measurement signal. The target current intensity is identified in such a way that the motion of the coupling element is set so that the vibrations of the vibrating element are at least partly absorbed. In a fourth method step, the control device controls the actual current intensity of the applied coil current to the identified target current intensity.

The target current intensity identified in the third method step, as has already been described, is identified in that the control device initially identified a detection component and a control component from the measurement signal. In so doing, the detection component describes that portion of the measurement signal that describes the voltage induced by the vibrating element in the electrical coil. The control component describes that portion of the measurement signal that is produced by an applied coil current in the electrical coil. The target current intensity is thus identified by the control device as a function of the detection component.

In accordance with some embodiments, operating an active vibration absorption system, may comprises the features that have already been described in connection with embodiments of the active vibration absorption system. For this reason, the corresponding embodiments of the method will not be described again here.

An exemplary embodiment will be described below. The following is shown:

The exemplary embodiment discussed below is a preferred embodiment of the invention. In the exemplary embodiment, the described components of the embodiment each represent individual features that should be considered independently of each other and that may also allow development independently of each other and that should thus also be considered individually or in a different combination from the one shown. Furthermore, the described embodiment can also be supplemented by more of the previously described features as described herein.

In the figures, functionally equivalent elements are provided with the same reference signs.

FIG. 1 is a schematic representation of an active vibration absorption system with a structure-borne sound exciter and a control device, in accordance with some embodiments. An active vibration absorption system 10 is only partly schematically shown in FIG. 1. Moreover, FIG. 1 shows a vibrating element 12. The vibrating element 12 can be a sheet metal part, for example. The vibrating element 12 can be part of a motor vehicle and/or an airplane and/or a ship and/or a construction machine. Therefore, the active vibration absorption system 10 can be used in the aviation and aerospace industries and/or in the shipbuilding industry and/or in building technology and/or mechanical and plant engineering. For example, the vibrating element 12 is a suspension arrangement of a tailgate of a motor vehicle, in particular a hinge and/or a locking clamp. The vibrating element 12 is set into vibration by external forced, such as the suspension of the tailgate, which is set into vibration depending upon the drive of the motor vehicle or the state of the roadway. The active vibration absorption system 10 comprises a structure-borne sound exciter 14, which is coupled to the vibrating element 12 by means of a coupling element 16. The coupling element 16 can be a part of the structure-borne sound exciter 14 in this instance. Here, the coupling element 16 is configured as a membrane unit of a speaker, for example.

The structure-borne sound exciter 14 additionally comprises an electrical coil 18 that, for example, is configured as a voice coil and is coiled onto a voice coil former, which is connected to the membrane unit. The electrical coil 18 is disposed in a magnetic field, which is not shown here. When the vibrating element 12 vibrates, the coupling element 16 is likewise caused to vibrate. In the process, the electrical coil 18 can also be set into vibration. An electromagnetic current is induced in the electrical coil 18 by the motion of the coupling element 16 and/or by the motion of the electrical coil 18. In addition, a coil current 20 is applied to the electrical coil 18 to dampen and/or to absorb the vibrations of the vibrating element 12. This coil current 20 likewise brings about a movement of the coupling element 16 and/or the electrical coil 18 by previously known electromagnetic induction forces. Thus, depending upon the current intensity, the motion of the coupling element 16 can be controlled such that it generates a counter-motion to the vibrations of the vibrating element 12 and thereby at least partly absorbs the vibrations of the vibrating element 12.

The structure-borne sound exciter 14 is configured to provide a measurement signal 22, wherein the measurement signal 22 describes, for example, a full voltage $U_0$ that is applied to the electrical coil 18. To measure the full voltage $U_0$, it is shown here that a resistor R is connected in the circuit of the electrical coil 18, for instance. A voltmeter V measures the full voltage $U_0$ by means of the resistor R. The measurement signal 22 is thus composed of a detection component, which corresponds to the voltage induced by the motion of the coupling element 16, and of a control component, which corresponds to a voltage produced by the applied coil current 20. The measurement signal 22 includes at least one signal value, wherein the at least one signal value expresses the detection component and the control component combined.

A control device 24 is connected to the structure-borne sound exciter 14. Said control device 20 is configured to control an actual current intensity of the coil current 20. This control occurs in dependence upon the measurement signal 22 that is provided by the structure-borne sound exciter 14. The control device 24 is further designed to identify a detection component and a control component from the measurement signal 22, for example, by transfer functions. The control device 24 is thus designed to separate the detection component and the control component from each other. Depending upon the detection component, the control device 24 then identifies a target current intensity that should be flowing through the electrical coil 18 so that an active counter-vibration to the vibrations of the vibrating element 12 is produced through the coupling element 16.

Figure 2:
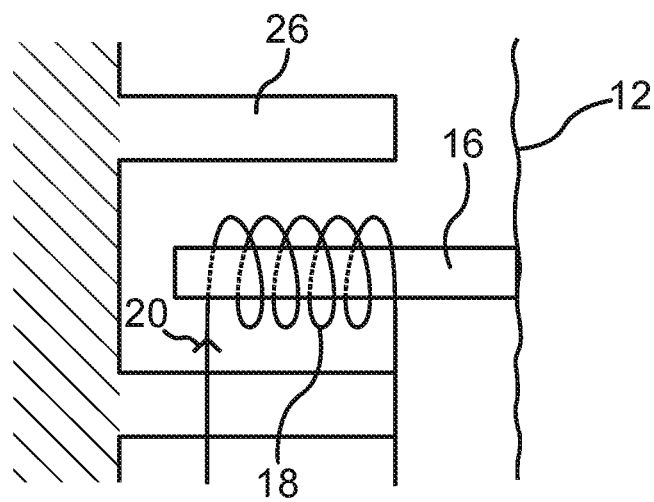
FIG. 2 is a schematic sectional view of an partly shown structure-borne sound exciter for an active vibration absorption system, in accordance with some embodiments.

FIG. 2 is a schematic sectional view of an partly shown structure-borne sound exciter for an active vibration absorption system, in accordance with some embodiments. FIG. 2 shows an alternative exemplary embodiment of the structure-borne sound exciter 14. Here, the structure-borne sound exciter 14 is represented only partly and schematically. The electrical coil 18 is fixedly arranged on a retaining device 26. The coupling element 16 is arranged in an interior space that is formed by the electrical coil 18 and is connected to the vibrating element 12; the coupling element is formed from a magnetic material, for example. The retaining device 26 can likewise be a permanent magnet. Depending upon the current intensity that is flowing through the electrical coil 18, the coupling element 16 is set into motion by induced electromagnetic forces. In this way, the direction of motion of the coupling element 16 can be determined depending upon the flow direction of the current, wherein the coupling element 16 has a movement axis that runs, for instance, parallel to the movement axis of the vibrations of the vibrating element 12. However, the coupling element 16 also set into motion by mechanical pulse transmission, for example, depending upon the vibrations of the vibrating element 12. The changing magnetic field in the electrical coil 18 causes an induced current to flow, which is added to the already applied coil current 20. Therefore, a precise control of the motion of the coupling element 16 and thus a precise damping and/or absorption of the vibrating element 12 are possible in this exemplary embodiment, as well.

Overall, the two exemplary embodiments demonstrate how a vibration of the vibrating element 12 is measured by the present active vibration absorption system 10 and a damping of this vibration is bought about at the same time. The structure-borne sound exciter 14 is simultaneously used as a measurement device and a damper. Due to a suitable design, in particular a measurement of its mass and/or flexibility and thus of its resonance frequency, the structure-borne sound exciter 14 can be adapted to any target systems that contain the vibrating element 12. The absorption and/or reduction of the vibrations can occur by an optimal control, such as an adaptive control and/or a so-called PID controller and/or a state controller. For this reason, no further manual adaptation to the respective target system is necessary. For example, the active vibration absorption system 10 requires only a single calibration and is configured to recalibrate itself depending upon the target system.

The invention claimed is:

1. An active vibration absorption system, comprising:
   a control device;
   a vibrating element;
   an electrical coil; and
   a structure-borne sound exciter,
   wherein the structure-borne sound exciter comprises a coupling element for coupling to the vibrating element, and the structure-borne sound exciter is configured to:
      detect an induced voltage in the electrical coil, and
      provide a measurement signal correlated with the detected induced voltage,
   wherein the coupling element is configured to:
      vibrate when the vibrating element is vibrating,
      induce an electromagnetic current in the electrical coil by a motion, and
      move in response to a flow of an electrical current in the electrical coil, and
   wherein the control device is configured to:
      receive the measurement signal,
      identify a first target strength of the electrical current corresponding to the measurement signal to adjust a movement of the coupling element,
      identify a detection component and a control component from the measurement signal,
      identify a second target strength of the electrical current corresponding to the detection component, and control an actual strength of the electrical current to meet the first target strength of the electrical current,
wherein the detection component corresponds to a voltage induced by the vibrating element,
wherein the control component is produced by the flow of the electric current in the electrical coil, and
wherein an adjustment of the movement of the coupling element absorbs vibrations of the vibrating element.

2. The active vibration absorption system of claim 1, wherein the control device is further configured to identify the detection component and the control component simultaneously for an identical signal value in the measurement signal.

3. The active vibration absorption system of claim 1, wherein the control device is further configured to identify the detection component and the control component using predetermined transfer functions.

4. The active vibration absorption system of claim 1, wherein the control device is further configured to identify the second target strength of the electrical current required to adjust a movement of the vibrating element.

5. The active vibration absorption system of claim 1, wherein the structure-borne sound exciter is further configured to measure the induced voltage in the electrical coil at at least one predefined point in time, and wherein the control device is further configured to control the actual strength of the electrical current at the at least one predefined point in time.

6. The active vibration absorption system of claim 1, wherein the control device is further configured to receive at least one measurement signal from the structure-borne sound exciter; and to control an actual strength of an electrical current for the first structure-borne sound exciter and an actual strength of an electrical current for a second structure-borne sound exciter.

7. The active vibration absorption system of claim 1, wherein the electrical coil is configured as a voice coil.

8. The active vibration absorption system of claim 1, wherein the structure-borne sound exciter is configured as a sound actuator.

9. A motor vehicle, comprising:
an active vibration absorption system, comprising:
a control device;
a vibrating element;
an electrical coil; and
a structure-borne sound exciter,
wherein the vibrating element is a sheet metal part of the motor vehicle,
wherein the structure-borne sound exciter comprises a coupling element for coupling the structure-borne sound exciter to the vibrating element, and the structure-borne sound exciter is configured to:
detect an induced voltage in the electrical coil, and
provide a measurement signal correlated with the detected induced voltage,
wherein the coupling element is configured to:
vibrate when the vibrating element is vibrating,
induce an electromagnetic current in the electrical coil by a motion, and
move in response to a flow of an electrical current in the electrical coil, and
wherein the control device is configured to:
receive the measurement signal,
identify a first target strength of the electrical current corresponding to the measurement signal to adjust a movement of the coupling element,
identify a detection component and a control component from the measurement signal,
identify a second target strength of the electrical current corresponding to the detection component, and
control an actual strength of the electrical current to meet the first target strength of the electrical current,
wherein the detection component corresponds to a voltage induced by the vibrating element,
wherein the control component is produced by the flow of the electrical current in the electrical coil, and
wherein the first target strength of the electrical current is set to cause the coupling element to move.

10. The motor vehicle of claim 9, wherein the sheet metal part of the motor vehicle is one or more of a roof, an engine hood, and a tailgate of the motor vehicle.

11. A method for absorbing vibration by a system comprising: a structure-borne sound exciter, a vibrating element and a coupling element, the method comprising:
detecting an induced voltage in an electrical coil of the structure-borne sound exciter, wherein the structure-borne sound exciter is coupled to the vibrating element via the coupling element,
wherein the coupling element is configured to:
vibrate by a vibration of the vibrating element,
move in response to a flow of an electrical current in the electrical coil, and
induce an electromagnetic current in the electrical coil in response to the movement of the coupling element; and wherein the method further comprises:
providing a measurement signal correlated with the detected induced voltage at the structure-borne sound exciter;
identifying a first target strength of the electrical current corresponding to the measurement signal; and
controlling an actual strength of the electrical current to meet the first target strength of the electrical current,
wherein the first target strength of the electrical current causes the coupling element to move,
thereby absorbing vibrations of the vibrating element.

12. The method of claim 11, further comprising:
identifying a detection component and a control component from the measurement signal,
wherein the detection component corresponds to the voltage induced by the vibrating element, and
wherein the control component is produced by applying an electrical current to the electrical coil.

13. The method of claim 12, further comprising identifying a second target strength of the electrical current as a function of the detection component to adjust a movement of the vibrating element.

* * * * *